(12) United States Patent
Parikka

(10) Patent No.: US 6,392,342 B1
(45) Date of Patent: May 21, 2002

(54) LIGHT SOURCE ARRANGEMENT FOR PLANAR APPLICATIONS

(75) Inventor: Marko Parikka, Halikko (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/458,639

(22) Filed: Dec. 9, 1999

(30) Foreign Application Priority Data

Dec. 10, 1998 (FI) ................................................ 982674

(51) Int. Cl.$^7$ ................................................ F21V 8/00
(52) U.S. Cl. .................... 313/512; 362/327; 362/257; 362/800; 362/329; 257/81; 257/99; 257/687
(58) Field of Search .......................... 312/512; 362/327, 362/257, 800, 329; 257/81, 84, 93, 99, 687, 701

(56) References Cited

U.S. PATENT DOCUMENTS 3,774,021 A   11/1973   Johnson ...................... 240/2.1
5,865,529 A * 2/1999   Yan ......................... 313/512 X

FOREIGN PATENT DOCUMENTS

EP   0403764 A1   12/1990
EP   0732679 A1   9/1996
EP   0751340 A2   1/1997

OTHER PUBLICATIONS

Patent Abstracts of Japan—No. JP10004215.

* cited by examiner

*Primary Examiner*—Ashok Patel
(74) *Attorney, Agent, or Firm*—Perman & Green, LLP

(57) ABSTRACT

A light source arrangement is used for providing illumination to an essentially planar area (405) in an electronic device. The arrangement comprises an encapsulated semiconductor light source (402) in the vicinity of an edge of an essentially planar light guide (404). Light emitted by the encapsulated semiconductor light source is to be coupled into the light guide through the edge. The encapsulated semiconductor light source comprises a semiconductor chip (301) encapsulated in an encapsulation block (302) that comprises a curved surface facing the edge of the planar light guide. The encapsulation block (302) has also a D-shaped cross section in a plane perpendicular to the plane of the essentially planar lightguide so that the arcuate part of the D corresponds to said curved surface. The encapsulation block extends to a predetermined distance in an extension direction locally perpendicular to the plane of said D-shaped cross section.

4 Claims, 4 Drawing Sheets

LIGHT SOURCE ARRANGEMENT FOR PLANAR APPLICATIONS

TECHNOLOGICAL FIELD

The invention relates in general to the opto-mechanical structure of semiconductor light sources. Especially the invention relates to the design of the encapsulation of such a light source for achieving optimal radiation characteristics.

BACKGROUND OF THE INVENTION

Semiconductor light sources or LEDs (Light Emitting Diodes) are widely used for lighting in all kinds of electrical appliances. Their advantages include small size, low power consumption and very long service life.

In many cases it is necessary to use a limited number of light sources to illuminate a relatively large surface; usually there is also the requirement of as even a radiation intensity over the whole surface as possible. A typical example is the case of providing a backlight to an LCD or Liquid Crystal Display. FIG. 1 is a schematic cross section through a known LCD backlight arrangement. The eye of the viewer is supposed to be at the top, looking down essentially along the normal of the surface of an LCD element 101. Below the LCD element there is a lightguide 102, which is an approximately planar element the purpose of which is partly to allow light to propagate in the horizontal direction and partly to refract it upwards through the LCD element. The origin of the light is a semiconductor light source 103 or usually a number of them distributed around the circumference of the lightguide 102.

The performance of the arrangement according to FIG. 1 is evaluated in terms of the distribution of illumination observed by the user. The more even the illumination over the whole area of the LCD element, the better the backlight arrangement. FIG. 2 illustrates some known imperfections in the illumination pattern viewed by a user. The light emitted by the light sources 201, 202 and 203 may not reach far enough in the lightguide to provide illumination to the far end of the LCD element, giving rise to a dark zone 204 at the far end. On the other hand, a significant amount of light may be refracted through the LCD element in the immediate vicinity of the light sources, producing bright spots 205, 206 and 207. Additionally the radiation lobes of the light sources may not be wide enough, resulting in dark corners 208 and 209 and dark wedges 210 and 211 between the light sources.

The general developmental trend in portable electronic devices is towards even further miniaturization. On one hand this requires further reduction in the physical size of the components, meaning for example that the lightguide 102 illustrated in FIG. 1 should be made thinner. On the other hand the miniaturization sets tighter and tighter requirements to the power consumption of the devices, because a small device needs a small battery the capacity of which is limited. These requirements have made it more difficult to evenly illuminate a planar area like an LCD. If the lightguide is made thinner the relative amount of light coupled into it tends to get smaller, which has a general detrimental effect on the illumination. The requirement for further reductions in power consumption would suggest using a smaller number of light sources around the area to be illuminated, which naturally makes it more difficult to distribute the generated light evenly.

SUMMARY OF THE INVENTION

It is an object of the present invention to provide an improved lighting arrangement for generating a relatively even distribution of illumination over an essentially planar surface. It is a further object of the invention to provide such a lighting arrangement that would consume a relatively low amount of power. An additional object of the invention is to provided a lighting arrangement of the above-described kind which is advantageous in terms of applicability to automated mass production.

The objects of the invention are achieved by providing a novel design for the transparent substance encapsulating each semiconductor light source.

It is characteristic to the light source arrangement according to the invention that an encapsulated semiconductor light source comprises a semiconductor chip encapsulated in an encapsulation block that comprises a curved surface facing the edge of an essentially planar light guide, has a D-shaped cross section in a plane perpendicular to the plane of the essentially planar lightguide, the arcuate part of the D corresponding to said curved surface and extends to a predetermined distance in an extension direction locally perpendicular to the plane of said D-shaped cross section.

According to the invention, the light generated in the semiconductor chip that constitutes the actual light source is collimated to a generally fan-like shape by using a transparent encapsulation around the semiconductor chip and designing it to a form that is basically an extruded D. The distance between the surface of the semiconductor light source and that of the surrounding encapsulation material in the principal direction of radiation is larger than the radius of curvature of the D-shaped surface. The encapsulated semiconductor light source is arranged into the close vicinity of a planar lightguide.

A study of the optical characteristics of the light source arrangement according to the invention shows that the fan-shaped distribution -of radiated light allows an effective coupling of radiated light into thinner lightguides than with prior art structures. Also the illumination pattern observed from a direction normal to the plane of the lightguide is more even. These advantages of the invention allow for the designer to select a suitable compromise between reduction in thickness and power consumption on one hand and enhanced illumination on the other. In other words, if the physical size and power consumption are the same as previously except for the novel design of the encapsulation, more effective illumination is achieved, and if the previously determined level of illumination is deemed sufficient, the number and size of separate components may be reduced.

BRIEF DESCRIPTION OF DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

FIGS. 1 and 2 have been referred to previously in context of the description of prior art, so the following discussion will concentrate on FIGS. 3a to 7.

DETAILED DESCRIPTION OF THE INVENTION

Figure 3A:
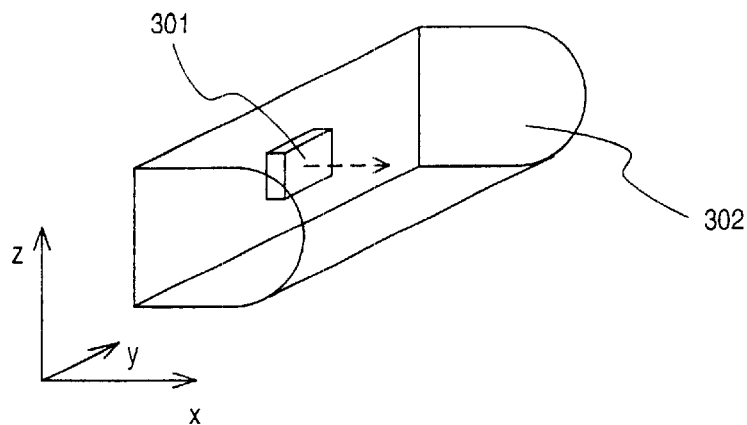
FIGS. 3a to 3c illustrate some structural principles according to the invention.

FIG. 3a shows the simplest meaning of an "extruded D" physical shape in a perspective drawing. An encapsulated semiconductor light source is shown where a semiconductor chip 301 capable of emitting electromagnetic radiation in the visible part of the spectrum (wavelengths between approximately 400 and 800 nm) is surrounded by a block of encapsulation material 302 which is transparent in at least a part of said range of visible wavelenghts. The shape of the semiconductor chip 301 has little significance to the invention; as an example a chip in the shape of a rectangular prism is shown. The principal direction of radiated light from the semiconductor chip is the x direction in the illustrated coordinate system.

The encapsulation block 302 has a constant cross section in the xz plane, the form of which resembles closely a capital D: it is limited by a first straight line segment in the z direction, two parallel second straight line segments each joining one end of the first straight line segment at a right angle and extending towards the positive x direction, and an arcuate section connecting those ends of the second line segments together that are not connected to the first line segment. With such a cross section the encapsulation block extends over a predetermined range in the y direction so that the resulting physical shape has a planar, rectangular back surface in the yz plane; parallel, planar and rectangular top and bottom surfaces in the xy plane; two parallel, planar, D-shaped end surfaces in the xz plane; and a curved front surface joining the arcuate sections of the D-shaped end surfaces and those sides of the top and bottom surfaces that are farthest away from the back surface. All terms that refer to certain directions, like "back", "top", "bottom", "end" and "front", are used throughout this patent application only as references to the location of the corresponding parts or surfaces in the drawings. They do not place any directional limitations to the manufacture or use of the light source arrangement according to the invention.

The semiconductor chip 301 is located approximately at the middle point of the back surface of the encapsulation block 302 so that the principal direction of radiation, illustrated with a dashed arrow, is from the front surface of the semiconductor chip directly to the positive x direction through the center of the curved front surface of the encapsulation block. Later we will describe the location alternatives of the semiconductor chip within the encapsulation block in greater detail. Connection leads will be needed to conduct an electric current through the semiconductor chip in order to produce an emission of light; the placement of these is unessential to the invention as long as they do not block the propagation of light so they are not separately shown in FIG. 3a.

Figure 3B:
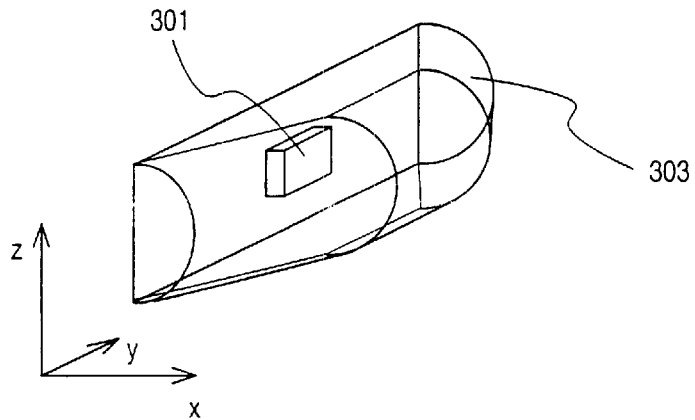

FIG. 3b illustrates another interpretation to the expression "extruded D". In FIG. 3b the encapsulation block 303 has exactly the same cross section in the xz plane as the encapsulation block 302 of FIG. 3a, when the cross section is taken through the center point of the semiconductor chip 301. From this particular central location to a predetermined equal distance in the positive and negative y directions the cross section remains the same, like in the embodiment of FIG. 3a. Thus at the middle of the encapsulation block in the y direction, the extrusion direction is said to be parallel to the y axis. However, towards the ends of the encapsulation block in the y direction, symmetrically at each end, there are sections where the extrusion direction abruptly changes by a certain amount from the y axis towards the negative x direction. The curved front surface of the encapsulation block consists of N facets (here: N=3) so that in mathematical terms each facet is the surface defined by the linear movement of a planar arc in the direction which is perpendicular to the plane of the arc. Said direction is also designated above as the (local) extrusion direction.

The invention does not limit the value of the number N as long as it is a positive integer. At very large values of N the form of the encapsulation block approaches that illustrated in FIG. 3c, which comprises a top view, an end view and a back view of an encapsulated semiconductor light source according to an advantageous embodiment of the invention. The outline of the encapsulation block 304 in this particular embodiment may again be described in mathematical terms so that it conforms to the surface defined by a D-shaped closed curve which is rotated by 180 degrees around the straight vertical line segment at the left of the D. It also falls within the definition "extruded D" if we accept the fact that extrusion may take place along an arcuate path which at each discrete location has a tangent that is perpendicular to the plane of the D. We may say that the extrusion direction is locally perpendicular to the plane of the D-shaped cross section.

Figure 3C:
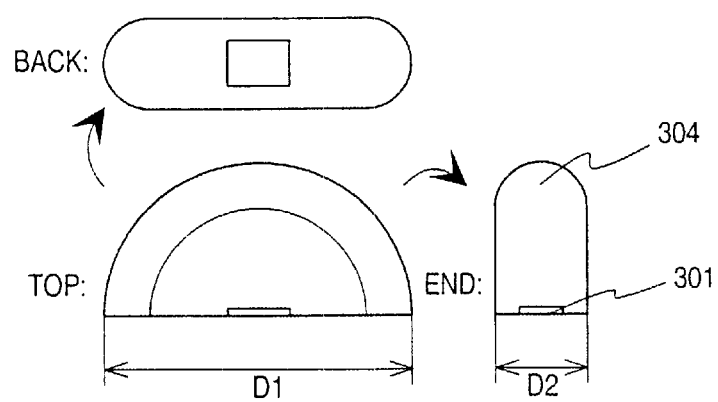
Figure 4:
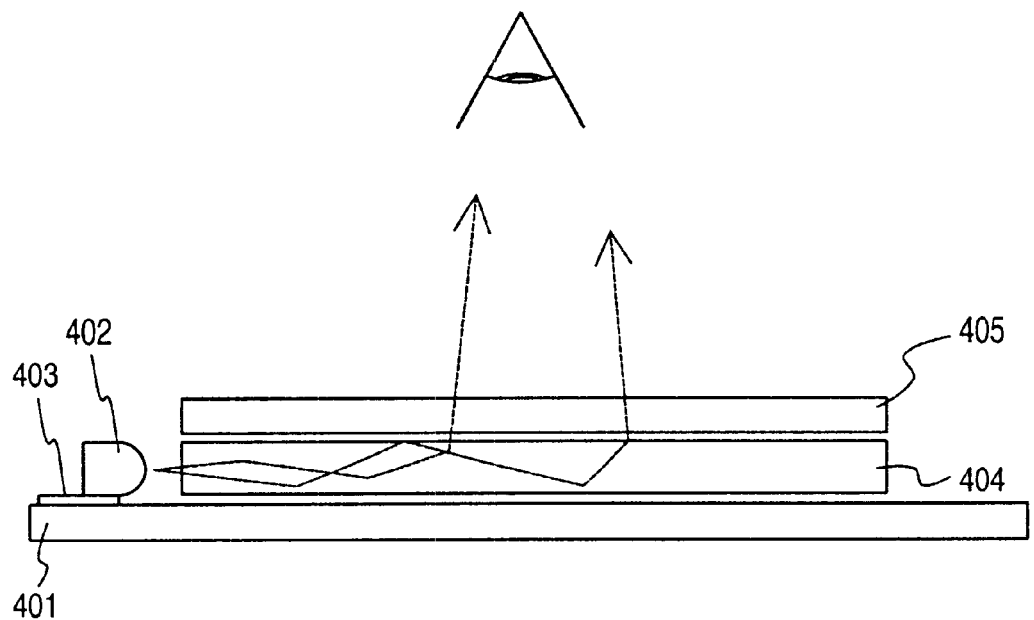
FIG. 4 is a cross section through an illumination arrangement according to the invention.

FIG. 4 is a schematic cross section through an illumination arrangement according to the invention. A PCB or Printed Circuit Board 401 serves as the mechanical support for the structure as well as the carrier of all necessary electrical connections to and from the different components. An encapsulated light source 402 having the structure described above in connection with one of FIGS. 3a to 3c is attached to a pair of connection pads 403 on the surface of the PCB; in other words a surface mounted version of the encapsulated light source is used. A planar lightguide 404 lies between the PCB 401 and an LCD element 405 so that a significant amount of the light emitted by the encapsulated light source is coupled into the lightguide. The optical characteristics of the planar light guide, known as such, are such that it will scatter and refract the light coupled into it upwards through the LCD element thus providing a backlight to the display.

Figure 5:
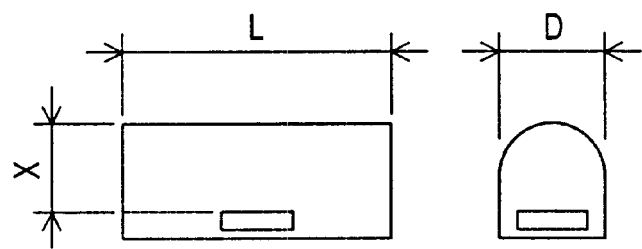
FIG. 5 illustrates some effects of dimensioning.

FIG. 5 illustrates some aspects of dimensioning the encapsulation block and placing the semiconductor chip within it when an encapsulation block according to FIG. 3a is used. A distance X describes the distance between the emission surface of the semiconductor chip and the farthest point on the limiting surface of the encapsulation block in the principal direction of radiation, i.e. the middle point of the curved front surface. Another distance D describes the distance between the planar top and bottom surfaces of the encapsulation block, i.e. the "thickness" of the encapsulation block, and still another distance L describes the distance between the planar end surfaces of the encapsulation block, i.e. the "length" of the encapsulation block. If the curved front surface of the encapsulation block is exactly one half of a circular cylindrical surface, the distance D is equal to the diameter of such a surface and consequently equal to two times the radius of curvature of the front surface. The invention does not require the curved front surface to be a part of a circular cylindrical surface; its cross section may be for example hyperbolic or parabolic (commonly known as curved conic sections) or it may have some other curved form.

In the following we will concentrate on analysing the distances X and L, in other words the "depth" in which the semiconductor chip lies in relation to the curved front surface and the width of the sector in which the semiconductor chip "sees" the endpoints of the curved front surfaces. It is assumed that the semiconductor chip lies in the middle of the encapsulation block in the z and y directions.

Figure 6A:
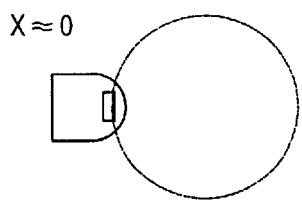
FIGS. 6a to 6c illustrate some dimensioning possibilities and FIG. 7 illustrates dimensioning in the horizontal plane.
Figure 6B:
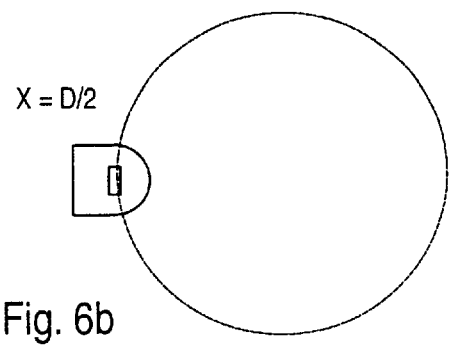
Figure 6C:
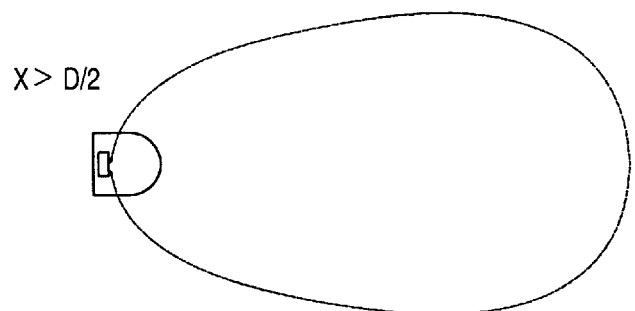

It has been noted in the development work of the present invention that if the distance X is close to zero as in FIG. 6a, the radiation pattern illustrates with a dashed line is close to a so-called Lambertian pattern in which the radiation emitted per unit area into a direction θ in relation to the principal direction of radiation follows the formula $I(\theta)=I(0)\cos\theta$. This pattern is not very advantageous in an arrangement according to FIG. 4 because a relatively large amount of light escapes without being coupled into the lightguide. If the distance X is increased from 0 towards a limiting value r which is equal to D/2, the radiation pattern continues to be essentially Lambertian with only its relative size increasing; see FIG. 6b. However, if the distance X is greater than D/2, the radiation pattern is not Lambertian any more but starts resembling a lobe like in FIG. 6c. In an arrangement according to FIG. 4 this is advantageous, because the narrower the lobe the larger the relative amount of light that will be coupled into the lightguide. The lobe will generally get narrower with the distance X increasing to higher values greater than D/2. Therefore it may be concluded that in an arrangement according to the invention, the distance between the emission surface of the semiconductor chip and the farthest point on the limiting surface of the encapsulation block in the x direction is advantageously larger than one half of the dimension of the encapsulation block in the z direction. A practical upper limit for the dimension X will be determined by the fact that the larger the distance X, the larger the size of the encapsulated semiconductor light emitting device so that at some point it will become unconveniently large.

Figure 1:
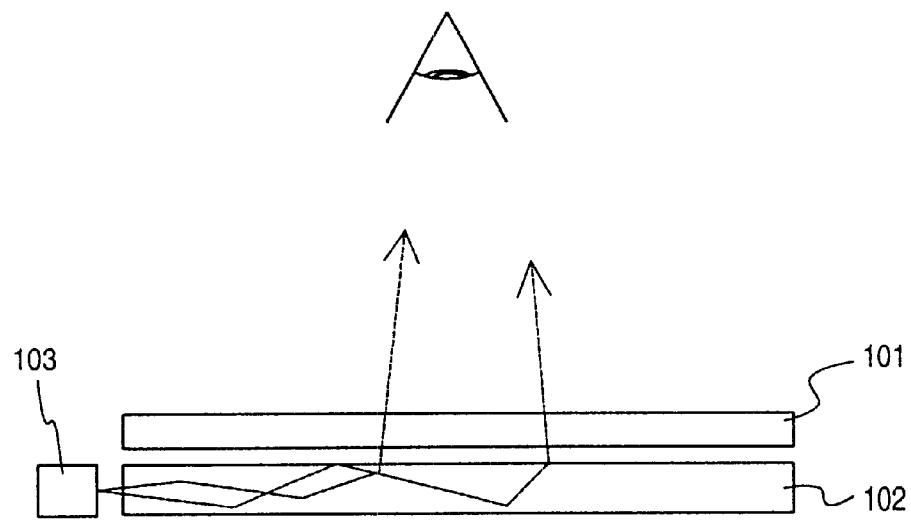
FIG. 1 illustrates a prior art illumination arrangement.
Figure 2:
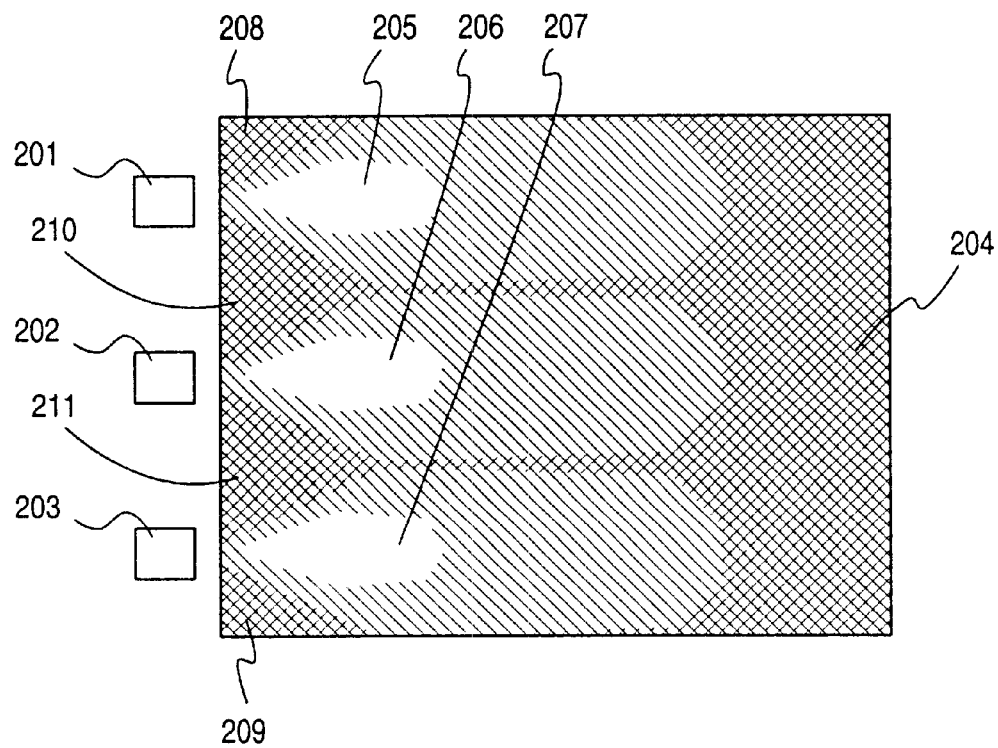
FIG. 2 illustrates some known imperfections of illumination.

Above we have analysed the form of the radiation pattern in the xz plane or the "vertical" plane in relation to the arrangement of FIG. 4. It is easy to understand that a narrow radiation lobe in the vertical direction will provide advantage by enhancing the coupling of light into the lightguide. However, in the xy plane or "horizontal" plane the situation is different: actually a wide radiation pattern would be advantageous because it would help in avoiding the dark corners and dark wedges illustrated previously in FIG. 2.

Figure 7:
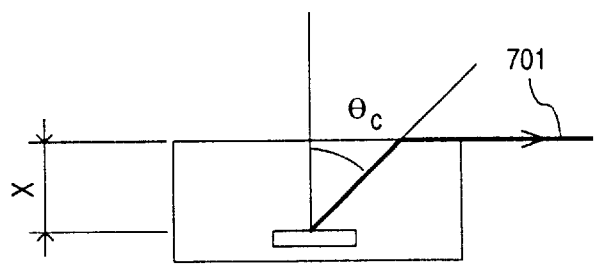

FIG. 7 illustrates the situation in the xy plane when the semiconductor chip is at some distance X from the front surface of the encapsulation block. The refraction index of the encapsulation material is generally larger than that of the surrounding air or other medium, so light emitted obliquely towards the front surface will generally refract into a direction more far away from the surface normal according to the known Snell's law. At some limiting angle $\theta_c$ a light ray emitted into that angle will be refracted to a direction parallel to the front surface like the ray 701 in FIG. 7. The formula for the critical angle is known to be $\theta_c=\arcsin(n_2/n_1)$, where $n_2$ and $n_1$ are the refraction indices of the surrounding medium and the encapsulation material respectively. The width L of the encapsulation block is most advantageously determined so that a light ray emitted to the critical angle in the xy plane will still hit the front surface and not an end surface of the encapsulation block, but light rays emitted at larger angles will hit the end surfaces. The corresponding definition of L will naturally depend on the distance X; mathematically the definition is $L=2X\tan\theta_c$. The distance L may also be larger. In determining the critical angle it must be noted that the emitted light will experience refraction also at the boundary between the semiconductor material and the encapsulation material; taking such a refraction into account is well within the capabilities of a person skilled in the art.

The results discussed above in connection with FIGS. 6a to 6c are easily applied to the embodiment of the invention where the encapsulation block has the form illustrated in FIG. 3c. It is easily noted from FIG. 3c that the radius of curvature of the limiting arcuate form of the encapsulation block in the end view is much smaller than the "extrusion radius" or the radius of curvature seen in the top view. Using the designations D1 and D2 as shown in FIG. 3c and X for the distance between the surface of the semiconductor chip and the front surface of the encapsulation block in the principal direction of radiation we note that $X\approx D1/2$ and $X>>D2/2$. The radiation pattern of the embodiment of FIG. 3c is therefore essentially Lambertian according to FIG. 6b in the horizontal plane but resembles the lobe of FIG. 6c in all vertical planes.

The embodiments presented above are naturally only examplary and they should not be understood as placing limitations to the applicability of the invention. For example, the invention does not require that the edge of the lightguide should be straight or that the lightguide should be rectangular in shape. In some applications the whole display arrangement may be for example circular, in which case it is natural that also the lightguide is circular. In that case the "extrusion direction" oor the direction known as the y direction in the drawings should coincide with the direction of a local tangent to the edge of the lightguide in the vicinity of the semiconductor light source. In another variation of the invention it is possible to apply a reflective coating to some surfaces of the encapsulation block other than the front surface, in order not to leave possible escape routes for light rays refracted back and forth inside the encapsulation block.

What is claimed is:

1. A light source arrangement for providing illumination to an essentially planar area in an electronic device, comprising an essentially planar light guide having an edge;

an encapsulated semiconductor light source in the vicinity of said edge of the essentially planar light guide so that light emitted by the encapsulated semiconductor light source is arranged to be coupled into the light guide through said edge;

within the encapsulated semiconductor light source a semiconductor chip; and an encapsulation block surrounding said semiconductor chip;

wherein said encapsulation block comprises a curved surface that faces the edge of the essentially planar light guide, said encapsulation block has a D-shaped cross section in a plane perpendicular to the plane of the essentially planar lightguide, the arcuate part of the D corresponding to said curved surface, and the form of the encapsulation block is defined by a surface corresponding to a rotation of said D-shaped cross section by 180 degrees around the straight vertical line segment at the left of the D.

2. A light source arrangement according to claim 1, wherein said curved surface has a cross section that is a curved conic section.

3. A light source arrangement according to claim 1, wherein said semiconductor chip has an emission surface facing said curved surface of the encapsulation block, and the curved surface has a middle point at the point where the central normal of said emission surface intersects the curved surface, so that the distance between said emission surface and said middle point along said central normal is larger than one half of the dimension of said encapsulation block in the direction perpendicular to the plane of the essentially planar lightguide.

4. A backlight arrangement to a display in a mobile telephone for providing illumination to said display, comprising an essentially planar light guide that is located behind said display and defines an edge;

an encapsulated semiconductor light source in the vicinity of said edge of the essentially planar light guide so that light emitted by the encapsulated semiconductor light source is arranged to be coupled into the light guide through said edge;

within the encapsulated semiconductor light source a semiconductor chip; and an encapsulation block surrounding said semiconductor chip;

wherein said encapsulation block comprises a curved surface that faces the edge of the essentially planar light guide, said encapsulation block has a D-shaped cross section in a plane perpendicular to the plane of the essentially planar lightguide, the arcuate part of the D corresponding to said curved surface, and the form of the encapsulation block is defined by a surface corresponding to a rotation of said D-shaped cross section by 180 degrees around the straight vertical line segment at the left of the D.

* * * * *